United States Patent
Goto et al.

[11] 3,900,355
[45] Aug. 19, 1975

[54] METHOD OF INTERNALLY WINDING REINFORCING MATERIAL AND OF PRODUCING REINFORCED SYNTHETIC PIPE

[75] Inventors: Toshiho Goto, Osaka; Yoshinori Nishino, Sen-nan, both of Japan

[73] Assignee: Hitachi Shipbuilding and Engineering Co. Ltd., Osaka, Japan

[22] Filed: Mar. 14, 1973

[21] Appl. No.: 341,119

[30] Foreign Application Priority Data
Apr. 15, 1972 Japan.............................. 47-37984
Apr. 15, 1972 Japan.............................. 47-37992
Apr. 15, 1972 Japan.............................. 47-37993

[52] U.S. Cl................ 156/74; 156/187; 264/270; 264/311; 264/312
[51] Int. Cl............................................ B32b 31/16
[58] Field of Search............. 156/44, 293, 294, 187, 156/184; 264/310–312, 114, 270, 258; 242/54, 54.4, 55.21, 128, 55; 57/34 CD, 76

[56] References Cited
UNITED STATES PATENTS

| | | | |
|---|---|---|---|
| 2,859,151 | 11/1958 | Usab et al......................... | 156/74 X |
| 2,915,425 | 12/1959 | Biedebach et al. ............. | 264/311 X |
| 3,150,219 | 9/1964 | Schmidt.............................. | 264/258 |
| 3,232,812 | 2/1966 | Lorentz et al. ..................... | 156/293 |
| 3,475,532 | 10/1969 | Guldenfels et al.................. | 264/310 |
| 3,555,142 | 1/1971 | Haener ............................... | 264/311 |
| 3,788,916 | 1/1974 | Gadelius............................. | 156/74 |

Primary Examiner—Charles E. Van Horn
Assistant Examiner—David A. Simmons
Attorney, Agent, or Firm—Farley, Forster & Farley

[57] ABSTRACT

A method for applying a fiber or fabric reinforcing material to an internal cylindrical surface in which the reinforcing material is first wound on a shaft, the shaft is then placed concentrically within a tubular cylinder, and the cylinder is rotated so as to centrifugally rewind the reinforcing material from the shaft onto the internal cylindrical surface of the cylinder. With this method, reinforced pipe is produced by applying a synthetic resin in liquid form to the internal cylindrical surface prior or subsequent to the application of the reinforcing material thereto, and the resin is set and bonded to the reinforcing material while the cylinder is rotated.

13 Claims, 14 Drawing Figures

3,900,355

METHOD OF INTERNALLY WINDING REINFORCING MATERIAL AND OF PRODUCING REINFORCED SYNTHETIC PIPE

The present invention relates to an internal winding method and to the production of reinforced synthetic pipe from a reinforcing material such as glass fiber by the use of said method.

Such pipe production has heretofore been carried out by using a method in which fiber is supplied to the center of a rotating tubular cylinder to centrifugally wind the fiber on the inner surface of the cylinder. According to this method, provision is made for moving the fiber supply axially of said cylinder to uniformly wind the fiber lengthwise of the cylinder, and for rotating the fiber supply to prevent the impartation of twist to the fiber. Therefore, the resulting mechanism is complicated since it is necessary to rotate the supply around its own axis and hence around the axis of the cylinder and to reciprocate the supply axially of the cylinder. Further, since it is impossible to accommodate a sufficient reciprocating distance from the standpoint of mechanisms, the application of internal winding to the inner surface of a relatively long cylinder, i.e., the production of a long plastic pipe reinforced with fiber has been difficult.

A first object of the present invention is to provide an internal winding method which makes it unnecessary to axially reciprocate the fiber supply or the cylinder for winding the fiber on the inner surface thereof and which also makes it unnecessary to rotate the fiber supply around its own axis for the purpose of preventing twist impartation.

In the method of the invention for applying a reinforcing material to an internal cylindrical surface, the reinforcing material is first wound on a shaft, the shaft is then placed concentrically within a cylinder having said internal cylindrical surface thereon and rotatable on the axis thereof, and rotation is imparted at least to the cylinder to create a relative rotational speed difference between the cylinder and the shaft so as to centrifugally rewind the reinforcing material from the shaft onto the internal cylindrical surface.

According to this method, if the reinforcing material is wound on the shaft over an axial length substantially equal to the length of the cylinder, the reinforcing material will be rewound onto the inner surface of the cylinder over the entire axial length thereof without the need to axially move the shaft or the cylinder. Moreover, even if the shaft is not rotated, no twist will be imparted to the reinforcing material during the rewinding process. Therefore, even with a very simple apparatus adapted to rotate the cylinder alone, it is possible to satisfactorily carry out the internal winding of a reinforcing material on a relatively long cylinder without imparting twist thereto.

A second object of the invention is to provide a method of efficiently producing a synthetic resin pipe reinforced with a reinforcing material by making use of this internal winding method.

Thus, after a reinforcing material is rewound onto the internal surface of the rotating cylinder by the method described above, a synthetic resin liquid is applied to the interior of the cylinder while the latter is continuously rotating to form a synthetic resin layer having the reinforcing material on the internal surface of the cylinder and the synthetic resin layer is then allowed to set while the cylinder is rotating, whereby a centrifugally formed synthetic resin pipe having a circumferentially continuous reinforcing material in the outer surface layer is obtained.

Further, according to the present invention, prior to the rewinding of the reinforcing material a synthetic resin liquid may be applied to the interior of the rotating cylinder to centrifugally form a synthetic resin layer. The reinforcing material may then be rewound onto the inner surface of the synthetic resin layer before it sets, thereby providing a synthetic resin pipe in which the reinforcing material has intruded into the inner surface of the resin layer so as to be integral therewith.

Other features and merits of the present invention will be understood from embodiments of the invention to be described below with reference to the accompanying drawings.

DESCRIPTION OF THE PREFERRED EMBODIMENTS

Figure 1:
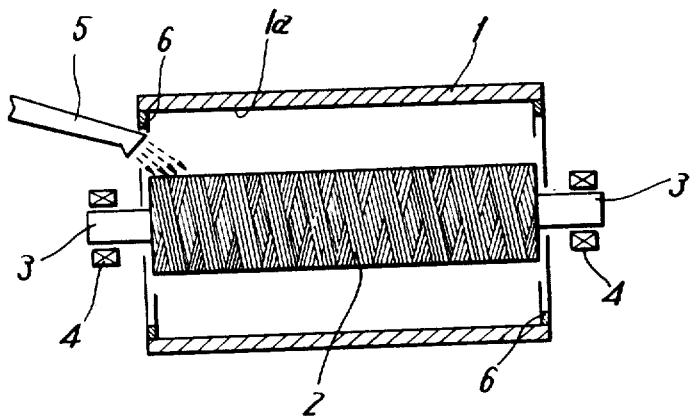
FIG. 1 is a longitudinal section of a shaft having a reinforcing material cross wound thereon, showing said shaft set in place within a rotatable cylinder.
Figure 2:
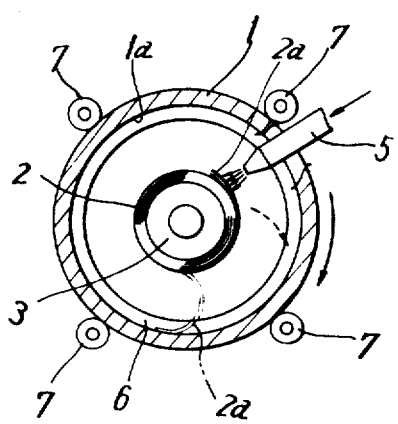
FIG. 2 is a cross section of FIG. 1.

In FIGS. 1 and 2, a cylinder 1 rotatable around its own axis has a shaft 3 concentrically received therein on which glass fiber 2 is cross wound. The fiber 2 is wound on the shaft 1 over a length substantially equal to the axial length of the fiber receiving inner surface 1a of the cylinder 1, and the shaft 3 is removably supported at both ends thereof in bearings 4 in such a manner that the wound fiber region is opposed to the receiving inner surface 1a of the cylinder 1. The terminal winding end 2a of the fiber 2 is positioned at one end of the wound fiber region. In order that said terminal winding end 2a may not hang down under its straightening property and its own weight and not touch the inner surface 1a of the cylinder before the latter reaches a predetermined rotational speed, pressurized air issuing from a pressurized air supply tube 5 is directed toward said terminal winding end 2a to lock the latter against the shaft 2. It is preferable that as shown in FIG. 1 the pressurized air supply tube 5 be positioned outside the cylinder 1 so that it may not interfere with the fiber 2 when the latter is rewound onto the inner surface 1a of the cylinder. The numeral 6 designates an inwardly extending flange provided on each end of the cylinder 1, and numeral 7 designates rollers supporting the cylinder 1.

Figure 3:
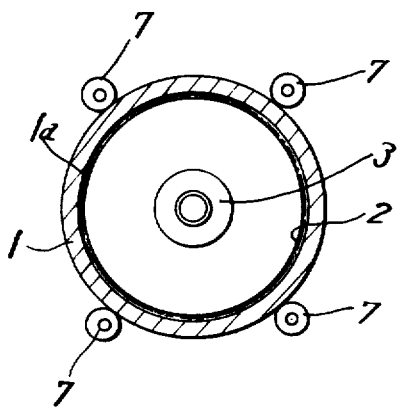
FIG. 3 is a cross section of FIG. 1 showing a reinforcing material which has been rewound.

The cylinder 1 is rotated in the unwinding direction of the fiber 2 either by driving one of the rollers 7 by a motor or by any other suitable means, the "unwinding direction of the fiber" meaning the direction opposite to that in which the fiber 2 is wound on the shaft 3. As shown in FIG. 2, the fiber 2 is wound on the shaft 3 in the counterclockwise direction and the cylinder 1 is rotated in the clockwise direction, thereby causing the fiber 2 to reverse direction, as indicated by the broken line showing of the fiber end 2a, within the annular space between the shaft 3 and the cylinder 1. When the rotational speed reaches a predetermined value, the terminal winding end 2a is released by removing the lock imposed thereon by the pressurized air from the pressurized air supply tube, thereby allowing the terminal winding end to hang down under its straightening property and its own weight. As a result, the fiber 2 is rotated along with the cylinder due to the friction between the fiber and the inner surface 1a of the cylinder and is subjected to a centrifugal force, so that it is unwound from the shaft 3 and rewound onto the inner surface 1a of the cylinder. Since the fiber 2 is cross wound on the shaft 3, it will be cross wound on the inner surface 1a of the cylinder over the entire length while it is being rewound thereonto. FIG. 3 shows the completion of the rewinding of the fiber 2.

In addition, if it is possible to allow the end 2a of the fiber 2 to hang down without touching the inner surface 1a of the cylinder, the pressurized air supply tube 5 may be omitted, so that when the cylinder reaches its predetermined rotational speed, the shaft 3 is rotated slightly in a direction such as will draw out the fiber until the end 2a touches the inner surface 1a of the rotating cylinder.

Figure 4:
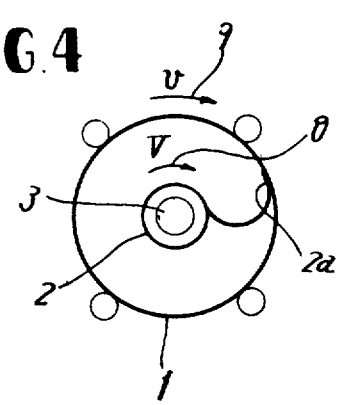
FIGS. 4 and 5 are schematic cross sections of FIG. 1 illustrating a rewinding operation when the shaft is also rotated.

In the above embodiment, the cylinder 1 alone is rotated in the unwinding direction of the fiber without rotating the shaft 3, but the present invention also contemplates that as shown in FIG. 4 the shaft 3 may be rotated in the same direction 8 as the fiber winding direction while the cylinder 1 is rotated in the same direction 9 as said direction 8 at a rotational speed v which is slower than the rotational speed V of said shaft 3, with the rotational speed difference being utilized to rewind the fiber 2 onto the inner surface 1a of the cylinder, and to cause the fiber 2 to reverse direction within the annular space between the shaft 3 and cylinder 1, as shown.

Figure 5:
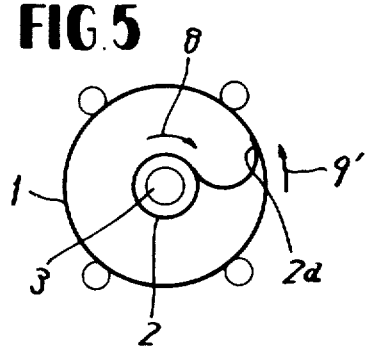

As shown in FIG. 5, if the direction of rotation 8 of the shaft 3 is the same as in the example shown in FIG. 4 and the cylinder 1 is rotated in the unwinding direction 9' of the fiber 2, it is possible to increase the rewinding speed of the fiber 2 by an amount corresponding to the rotational speed of the shaft 3 as compared with the example shown in FIG. 2. Again, the fiber 2 reverses direction during the rewinding step.

By modifying the method of rewinding the fiber, the air resistance acting on the fiber, tension, centrifugal force, etc., the factors which determine the properties of the rewound fiber can be optionally controlled. Further, in the case where the air resistance acting on the fiber becomes a problem, the opposite ends of the cylinder 1 may be sealed and the interior may be evacuated or the air in the interior may be replaced by a gas of less resistance.

In the above embodiment, an example has been shown in which as a reinforcing material to be wound on the shaft, use is made of glass fiber in rope or yarn form which is cross wound on the shaft, but it is also possible to utilize a fabric reinforcing material whose width is substantially equal to the entire length of the inner surface of the cylinder, as described in the following embodiment.

Figure 6:
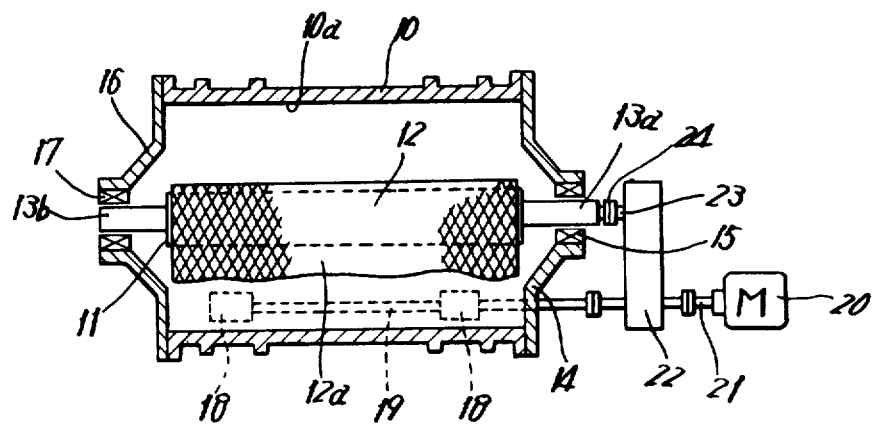
FIGs. 6 and 9 are longitudinal sections illustrating the use of a reinforcing material in the form of a fabric.

Thus, as shown in FIG. 6, a fabric 12 consisting of glass fiber and having a width substantially equal to the length of the inner surface 10a of a cylinder 10 is wound in advance on a shaft 11 concentrically received in the central region of the cylinder 10 and having shaft portions 13a, 13b at the opposite ends, the direction of winding being opposite to the direction of rotation of said cylinder 10.

One end 13a of the shaft is rotatably and removably supported through a bearing 15, located in a fixed cover 14 installed to close one end of the cylinder 10. The other shaft end 13b is rotatably supported through a bearing 17 located in a removable cover 16 installed to close the other end of the cylinder 10. Therefore, by removing the cover 16, the shaft 11 can be withdrawn from the cylinder 10. The cylinder 10 is rotatably supported on rollers 18, and at least one roller shaft 19 is connected to the driving shaft 21 of a motor 20. The driving shaft 21 has a clutch mechanism 22 mounted thereon, and a shaft 23 deriving power from the clutch mechanism 22 is capable of being operatively rotated along with said roller shaft or individually rotated or stopped. Further, the power deriving shaft 23 is connected to the shaft end 13a through a detachable coupling 24.

Figure 7:
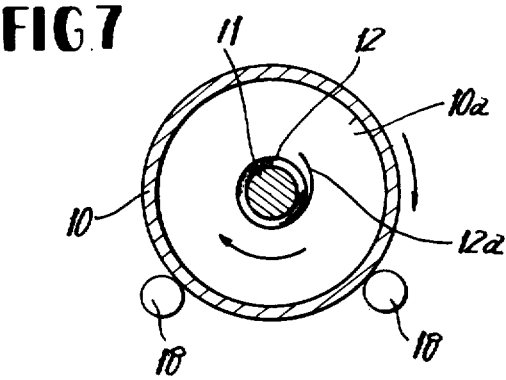
FIGS. 7 and 8 are cross sections explanatory of the rewinding transfer action involved in FIGS. 6 and 9.
Figure 8:
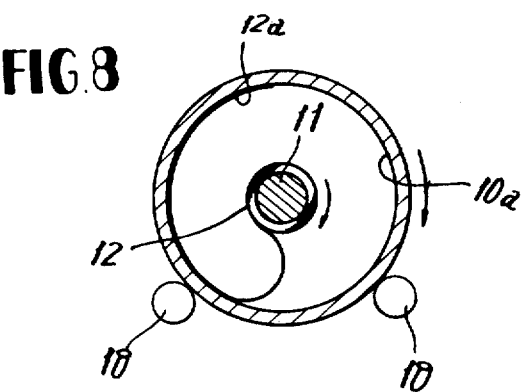

In the winding operation, the shaft 11 and cylinder 10 are operatively rotated by the motor 20 in the same direction as shown in FIG. 7. Thus, the fabric 12 is rotated integrally with the shaft 11 without being drawn out from the shaft 11. When the rotational speed of the cylinder 10 and shaft 11 is increased to reach the predetermined value, the clutch mechanism 22 is operated to free the shaft 11. Then the rotational speed of the shaft 11 is gradually decreased and the termanal winding end 12a of the fabric is separated from the shaft 11 and hangs down to touch the inner surface 10a of the rotating cylinder. The fabric is concomitantly rotated due to the friction between it and the inner surface 10a, and the fabric 12, subjected to a centrifugal force, is rewound and reverses direction within the annular space between the shaft 11 and cylinder 10 while being gradually unwound from the shaft 11, as shown in FIG. 8. The rewinding transfer of the fabric 12 is smooth without being subjected to air resistance since the air inside the rotating cylinder 1 is rotated in a closed state.

Figure 9:
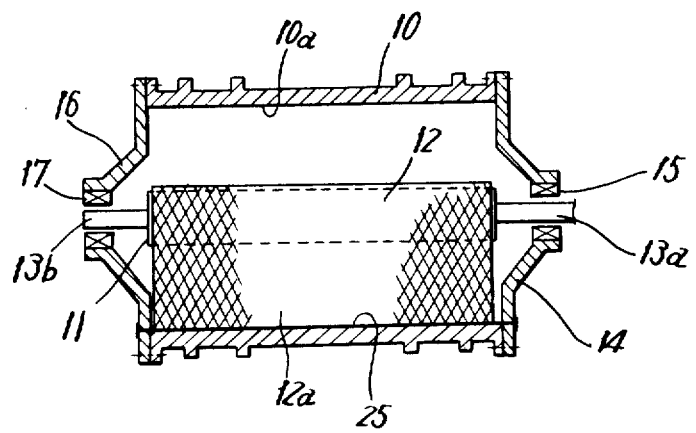

The amount of fabric 12 to be wound in advance on the shaft 11 can be optionally determined. By changing the amount wound, it is possible to change the number of rewound layers of the fabric 12 on the inner surface 10a. Further, the fabric 12 may be divided axially of the shaft 11 into a plurality of strips, which may then be rewound at the same time. In order to prevent a flapping phenomenon from occurring in the terminal winding end 12a of the fabric 12 at the start of the rewinding operation, the terminal winding end 12a may be fixed in advance to the cylinder 10 by a string 25 removably installed between covers 14 and 16, as shown in FIG. 9. This method in which the terminal winding end is fixed to the inner surface 10a of the cylinder may also be utilized when a reinforcing material such as fiber in rope form or knitted or woven in band form is cross wound on the shaft. In all cases, as shown in FIGS. 7 and 8, it is absolutely necessary that the shaft 11 be rotated along with the cylinder 10 until the cylinder 10 reaches a predetermined speed.

The internal winding method of the present invention described above may be utilized in the following manner.

Thus, it may be utilized in a method of reinforcing pipes wherein a pipe to be reinforced is used as the cylinder 1 or 10 or is fixed within said cylinder and the inner surface of the pipe is thickly coated with an adhesive whereby a reinforcing material to be rewound is bonded thereto so as to be made integral therewith; or in another method of reinforcing pipes wherein instead of coating the inner surface of a pipe, a reinforcing material itself is coated with a thermosetting adhesive in advance and is integrally bonded to the inner surface of a pipe by heating it after the reinforcing material is rewound thereonto.

Further, by immersing a reinforcing material in a bath of thermosetting resin, winding the material on the shaft, applying a parting agent to the inner surface of the cylinder, rewinding the reinforcing material onto the inner surface of the cylinder to provide a required thickness, and heating the cylinder while it is being rotated, it is possible to produce a reinforced synthetic resin pipe in which the reinforcing material forms the pipe wall.

Figure 10:
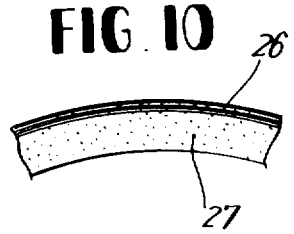
FIGS. 10 and 11 are enlarged partial sections of reinforced synthetic resin pipes produced by using the present methods.
Figure 11:
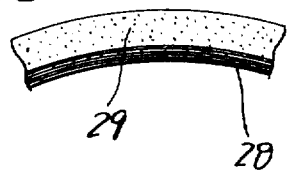

As an alternative method to said direct production of a reinforced synthetic resin pipe, if, after the completion of the rewinding of a reinforcing material, a synthetic resin liquid is supplied to the interior of the cylinder while the cylinder is being rotated to centrifugally form a synthetic resin layer and the latter is heated for setting whereupon the cylinder is stopped, then it is possible to obtain a reinforced synthetic resin pipe 27 in which a reinforcing material 26 exists in the surface layer as shown in FIG. 10. Further, if the centrifugal formation of a synthetic resin layer is effected prior to the internal rewinding of a reinforcing material, it is possible to obtain a reinforced synthetic pipe 29 in which a reinforcing material 28 exists in the inner surface layer, as shown in FIG. 11. In this case also, the heating and setting of the synthetic resin layer is effected after the internally rewinding of the reinforcing material.

The following embodiment is an example of the method of producing a reinforced synthetic resin pipe such as shown in FIG. 1.

Figure 12:
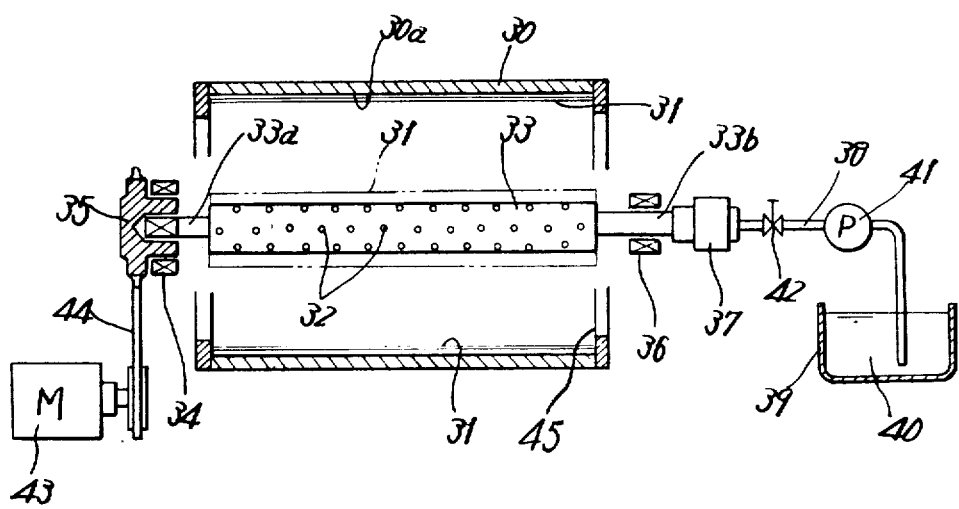
FIG. 12 is a longitudinal section of an alternate apparatus for producing such pipe.
Figure 13:
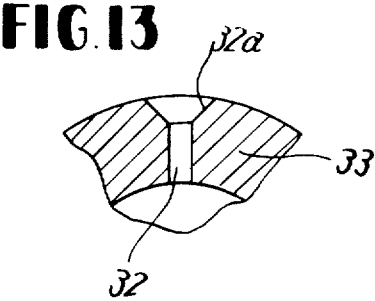
FIG. 13 is an enlarged sectional detail of the discharge portion of a nozzle tube; and, FIG. 14 is a cross section of FIG. 12.
Figure 14:
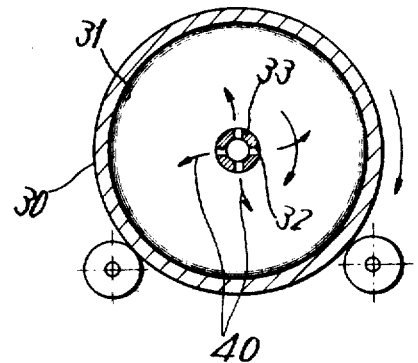

FIG. 12 shows a condition in which a reinforcing material 31 has been rewound onto the inner surface 30a of a cylinder 30 by a method such as already described. The shaft which was previously used to wind the reinforcing material thereon is replaced by a nozzle tube 33 having a number of resin discharging apertures 32 in the outer peripheral surface thereof and concentrically placed within the cylinder 30. As shown in FIG. 13, such a discharging aperture 32 has a funnel-shaped front end opening 32a. In addition, the cylinder 30 is left rotating. The closed end shaft portion 33a of the nozzle tube 33 is joined to a driven wehel 35 removably supported in a bearing 34, the open end shaft portion 33b of the nozzle tube 33 is removably supported in a bearing 36, and resin supply tube 38 is connected through a rotary fluid coupling 37 to the open end projecting through the bearing 36. A synthetic resin liquid 40 in a tank 39 is pressurized by a pump 41 and supplied to the nozzle tube 33 through an on-off cock 42 and the rotary fluid coupling 37.

The nozzle tube 33 is set in position as illustrated and is driven in the same direction and at the same rotational speed as the cylinder 30 by transmitting the rotational power from a motor 43 to the driven wheel 35 through a chain 44 or the like. When the synthetic resin 40 is supplied into the nozzle tube 33 by the pump 41, it spouts out through the discharging apertures 32 of the nozzle tube 33 and is supplied to the layers of the reinforcing material 31 on the inner surface 30a of the rotating cylinder. A resin layer is centrifugally formed on the inner surface 30a of the cylinder in such a manner that it thoroughly penetrates into the reinforcing material 31 due to centrifugal force. When a predetermined amount of synthetic resin liquid has been supplied, the on-off cock 42 is closed and the pump 41 is stopped, allowing the synthetic resin liquid within the nozzle 33 to be thoroughly discharged under a centrifugal force developed by the rotation thereof, thereby centrifugally forming a synthetic resin layer having a predetermined thickness. Thereafter, by heating and setting the synthetic resin layer within the cylinder while continuing the rotation of the cylinder, a reinforced synthetic resin pipe having a crosssectional structure such as shown in FIG. 10 is obtained. The withdrawal of the completed pipe is effected either by withdrawing resin flow-out preventive flanges 45 attached to the opposite ends of the cylinder 30 to pull out the pipe from the cylinder 30, or by disassembling the cylinder 30 by designing the latter to be axially or circumferentially dividable into a plurality of pieces.

In addition, it is desirable that the nozzle tube 33 be withdrawn at the time of heating operation. If the amounts of reinforcing material 31 and synthetic resin liquid to be supplied are taken into consideration, it is also possible to produce a pipe in which the reinforcing material fills up the entire wall thickness.

The supply of the synthetic resin liquid may be effected by using an unrotatable nozzle, but when effected by using the nozzle tube 33 which is rotatable around its own axis so as not to create any relative rotation between it and the rotating cylinder 30, there is almost no relative circumferential movement between the resin discharged and the reinforcing material on the inner surface of the cylinder, and there is no danger of the reinforcing material being displaced rearwardly with respect to the direction of rotation and disturbed when the discharged resin impinges against the reinforcing material. Therefore, it is possible to maintain the thickness of the reinforcing material uniform and produce a reinforced synthetic resin pipe superior in strength. Further, since the synthetic resin liquid within the nozzle tube can be thoroughly discharged by centrifugal force, this is very convenient for aftertreatment.

The nozzle tube 33 has been described as being substituted for a shaft on which a reinforcing material is wound in advance and which is concentrically placed within the cylinder, but if the nozzle tube 33 is used to serve also as said shaft to wind the reinforcing material 33 directly on the nozzle tube as shown in phantom lines in FIG. 12 and, after the reinforcing material 31 is rewound from the nozzle tube 33 onto the inner surface 30a of the cylinder, the pump 41 is driven and the on-off cock 42 is opened to supply the synthetic resin liquid to the nozzle tube 33 then it is possible to greatly increase the efficiency of operation since the supply of the synthetic liquid can be effected immediately after the completion of the rewinding of the reinforcing material.

In addition, although as a cylinder to wind a reinforcing material on the inner surface thereof a cylinder having a right-circular inner surface has been shown, said inner-surface configuration is not limited to a right circle.

Further, as a reinforcing material, use may be made of tungsten fiber, carbon fiber, whiskers and the like, which is highly resistant to heat, in addition to glass fiber. In the case of using such materials, it is possible to supply a molten metal in place of a synthetic resin liquid to centrifugally cast a metal pipe having a reinforcing material existing therein.

We claim:

1. The method of applying a reinforcing material to an internal cylindrical surface which includes:
    winding the reinforcing material on a shaft;
    placing the shaft concentrically within a cylinder having said internal cylindrical surface thereon and rotatable on the axis thereof, the shaft having a diameter less than that of the cylindrical surface thereby providing an annular space between the shaft and the cylindrical surface; and,
    rewinding the reinforcing material from the shaft onto the internal cylindrical surface by rotating at least the cylinder to produce a rotational speed difference between the cylinder and the shaft such as to unwind the reinforcing material from the shaft, the reinforcing material reversing direction within said annular space during the rewinding step.

2. The method of claim 1 wherein the reinforcing material is cross wound on the shaft and cross rewound onto the internal cylindrical surface.

3. The method of claim 1 wherein the reinforcing material is a fabric wound on the shaft and rewound onto the internal cylindrical surface.

4. The method of claim 1 wherein the ends of the cylinder are sealed after the shaft is placed within the cylinder and before rotation is imparted to the cylinder.

5. The method of claim 1 wherein the reinforcing material wound on the shaft has a terminal winding end, retaining the terminal winding end against the shaft, and releasing the terminal winding end when the cylinder reaches a predetermined rotational speed to permit the terminal winding end to move into contact with the internal cylindrical surface.

6. The method of claim 1 wherein a synthetic resin liquid is supplied through a rotatable nozzle tube placed concentrically within the cylinder and rotated in the same direction as the direction of rotation of the cylinder.

7. The method of claim 1 wherein the shaft on which a reinforcing material is wound is a nozzle tube through which the synthetic resin is supplied after the reinforcing material has been rewound from the shaft onto the internal cylindrical surface.

8. The method of applying a reinforcing material to an internal cylindrical surface which includes:
    winding the reinforcing material on a shaft, the reinforcing material having a terminal winding end;
    mounting the shaft concentrically within a cylinder having said internal cylindrical surface thereon and rotatable on the axis thereof, the shaft having a diameter less than that of the cylindrical surface thereby providing an annular space between the shaft and the cylindrical surface;
    retaining the terminal winding end of the reinforcing material out of contact with the internal cylindrical surface;
    rotating at least the cylinder to produce a rotational speed difference between the cylinder and shaft such as to unwind the reinforcing material from the shaft; and,
    permitting the terminal winding end of the reinforcing material to contact the internal cylindrical surface when the cylinder reaches a desired rotational speed, thereby initiating a rewinding of the reinforcing material from the shaft onto the internal cylindrical surface in which rewinding the material reverses direction within said annular space.

9. The method of claim 8 in which the terminal winding end of the reinforcing material is retained out of contact with the internal cylindrical surface by rotating the shaft in the direction which winds the material thereon.

10. The method of claim 8 in which the terminal winding end of the reinforcing material is permitted to contact the internal cylindrical surface by rotating the shaft.

11. The method of claim 8 in which a thermosetting substance is applied to the reinforcing material prior to the winding of said material on the shaft, and said substance is set subsequent to said rewinding step and while the cylinder is rotating.

12. The method of claim 8 wherein a synthetic resin liquid is applied to the internal cylindrical surface prior to said rewinding step, and the synthetic resin liquid is set subsequent to said rewinding step and while the cylinder is rotating.

13. The method of claim 8 wherein a synthetic resin is applied to the internal cylindrical surface subsequent to said rewinding step and is set while the cylinder is rotating.

* * * * *